US008463222B2

(12) United States Patent
Su et al.

(10) Patent No.: US 8,463,222 B2
(45) Date of Patent: Jun. 11, 2013

(54) MULTIPLE-INPUT-MULTIPLE-OUTPUT ANTENNA DEVICE

(75) Inventors: Saou-Wen Su, Taipei (TW); Lin-Han Tsai, Taipei (TW); Chuan-Hsing Chen, Taipei (TW)

(73) Assignee: Lite-On Technology Corporation, Neihu Taipei (TW)

( * ) Notice: Subject to any disclaimer, the term of this patent is extended or adjusted under 35 U.S.C. 154(b) by 418 days.

(21) Appl. No.: 12/791,176

(22) Filed: Jun. 1, 2010

(65) Prior Publication Data

US 2011/0151810 A1    Jun. 23, 2011

(30) Foreign Application Priority Data

Dec. 22, 2009  (CN) .......................... 2009 1 0261357

(51) Int. Cl.
*H04B 1/18*    (2006.01)
(52) U.S. Cl.
USPC .......................... 455/289; 455/272; 455/13.3
(58) Field of Classification Search
USPC .................. 455/562.1, 13.3, 103, 575.7, 129, 455/272–274, 280, 289; 343/777, 876
See application file for complete search history.

(56) References Cited

U.S. PATENT DOCUMENTS

2005/0129154 A1*  6/2005  Olesen et al. .................. 375/347
2008/0204331 A1*  8/2008  Shtrom .......................... 343/702

\* cited by examiner

*Primary Examiner* — Christian Hannon
(74) *Attorney, Agent, or Firm* — Rosenberg, Klein & Lee

(57) ABSTRACT

A Multiple-Input-Multiple-Output (MIMO) antenna device is adapted for connecting electrically to a radio frequency (RF) circuit for transmitting and receiving RF signals. The MIMO antenna device includes a circuit board, a plurality of antenna units, and a plurality of multiplexer units. The antenna units are disposed on the circuit board proximate to a peripheral edge thereof, are arranged in a loop formation, and are divided into a plurality of groups of the antenna units. Each of the multiplexer units is connected electrically to a respective one of the groups of the antenna units for selecting one of the corresponding antenna units and for connecting electrically the selected one of the corresponding antenna units to the RF circuit, thereby achieving the MIMO technique with the independently and simultaneously operating antenna units.

18 Claims, 10 Drawing Sheets

MULTIPLE-INPUT-MULTIPLE-OUTPUT ANTENNA DEVICE

CROSS-REFERENCE TO RELATED APPLICATION

This application claims priority of Chinese Application No. 200910261357.4, filed on Dec. 22, 2009.

BACKGROUND OF THE INVENTION

1. Field of the Invention

The present invention relates to an antenna device, more particularly to Multiple-Input-Multiple-Output (MIMO) antenna device.

2. Description of the Related Art

U.S. Patent Application Publication Nos. 20060109067 and 20060192720 disclose two conventional smart array antenna systems, each of which includes a plurality of printed dipole antenna units that are large in dimensions and that are coupled to a single Radio Frequency (RF) port via a network comprising transmission cables, phase shifters, and power dividers. Such arrangement of the smart array antenna system, the network, and the RF port causes the printed dipole antenna units of the smart array antenna system to be unable to operate independently. The conventional smart array antenna systems are therefore unable to achieve maximum data rates between 450 Mbps and 600 Mbps (802.11n standard), and only conform to the specifications of the 802.11a/b/g standards. Consequently, wireless access points or wireless routers that employ the conventional smart array antenna systems cannot utilize the Multiple-Input-Multiple-Output (MIMO) technique for increased throughput.

Hence, there is a need in the art to provide a MIMO antenna system that can be installed inside wireless access points or wireless routers, and that includes antenna units adapted to operate independently so as to increase transmission throughput by utilizing the MIMO technique such that the MIMO antenna system conforms with the 802.11a/b/g/n standards.

SUMMARY OF THE INVENTION

Therefore, an object of the present invention is to provide a Multiple-Input-Multiple-Output (MIMO) antenna device with high directivity, high throughput, and multi-operation bands.

According to one aspect, a MIMO antenna device of the present invention is adapted for connecting electrically to a radio frequency (RF) circuit so as to transmit and receive RF signals. The MIMO antenna device includes a circuit board, a number (N) of antenna units, a (1×M)-multiplexer unit, and a (1×(N−M))-multiplexer unit. (N) is an integer not smaller than 5, and (M) is an integer that is not smaller than 2 and that is smaller than (N−1). The circuit board has a peripheral edge. The (N) antenna units are disposed on the circuit board proximate to the peripheral edge of the circuit board, and are arranged in a loop formation. The (1×M)-multiplexer unit is disposed on the circuit board, is connected electrically to (M) corresponding ones of the (N) antenna units, and is operable to select one of the (M) corresponding ones of the antenna units for connecting electrically the selected one of the antenna units to the RF circuit. The (1×(N−M))-multiplexer unit is disposed on the circuit board, is connected electrically to remaining (N−M) corresponding ones of the (N) antenna units, and is operable to select one of the (N−M) corresponding ones of the antenna units for connecting electrically the selected one of the antenna units to the RF circuit. Thus, by causing two of the (N) antenna units to operate independently, the MIMO antenna device is able to utilize the MIMO technique so as to achieve high data rate and antenna radiation beamforming.

Preferably, the circuit board has a ground plane (e.g., a grounding unit). The (N) antenna units are disposed to surround the ground plane, are one-wavelength loop antennas having a balanced structure, and are operable to suppress excited surface currents of the ground plane such that the ground plane acts as a reflector for improving radiation directivity and gain of radiation patterns of each of the antenna units.

Preferably, the MIMO antenna device further includes a controller connected electrically to the (1×M)-multiplexer unit and the (1×(N−M))-multiplexer unit for controlling operations thereof. The (1×M)-multiplexer unit is controlled by the controller to select one of the (M) corresponding ones of the antenna units for connecting electrically the selected one of the antenna units to the RF circuit. The (1×(N−M))-multiplexer unit is controlled by the controller to select one of the (N−M) corresponding ones of the antenna units for connecting electrically the selected one of the antenna units to the RF circuit.

Preferably, to systematically control operations of the (N) antenna units, the MIMO antenna device further includes a signal-source determining unit that is connected electrically to the controller and that is adapted to be coupled to the RF circuit. The signal-source determining unit is operable to determine a source of a RF signal based on intensity of the RF signal received by each of the (N) antenna units and to generate a control signal corresponding to the source of the RF signal for controlling the controller. The controller is responsive to the control signal so as to control: the (1×M)-multiplexer unit to select one of the (M) corresponding ones of the (N) antenna units able to receive a maximum intensity of the RF signal relative to other ones of the antenna units of the (M) corresponding ones of the (N) antenna units for connecting electrically the selected one of the antenna units in the (M) corresponding ones of the (N) antenna units to the RF circuit; and the (1×(N−M))-multiplexer unit to select one of the (N−M) corresponding ones of the (N) antenna units able to receive a maximum intensity of the RF signal relative to other ones of the antenna units in the (N−M) corresponding ones of the (N) antenna units for connecting electrically the selected one of the antenna units in the (N−M) corresponding ones of the (N) antenna units to the RF circuit.

According to another aspect, a Multiple-Input-Multiple-Output (MIMO) antenna device of the present invention is adapted for connecting electrically to a radio frequency (RF) circuit so as to transmit and receive RF signals. The MIMO antenna device includes a circuit board, a number (N) of antenna units, and three (1×(N/3))-multiplexer units. The circuit board has a peripheral edge. The (N) antenna units are disposed on the circuit board proximate to the peripheral edge of the circuit board and are arranged in a loop formation. (N) is an integer not smaller than 6 and is a multiple of 3. The three (1×(N/3))-multiplexer units are disposed on the circuit board. Each of the (1×(N/3))-multiplexer units has (N/3) input terminals that are connected electrically and respectively to (N/3) corresponding ones of the (N) antenna units and are operable to select one of the (N/3) corresponding ones of the (N) antenna units for connecting electrically the selected one of the (N/3) corresponding ones of the (N) antenna units to the RF circuit. Therefore, the MIMO antenna device is able to utilize the MIMO technique with a plurality of independently and simultaneously operating antenna units.

Preferably, the MIMO antenna device of the present invention further includes a controller connected electrically to the (1×(N/3))-multiplexer units. Each of the (1×(N/3))-multiplexer units is controlled by the controller to select one of the (N/3) corresponding ones of the antenna units connected thereto for connecting electrically the selected one of the antenna units to the RF circuit.

Preferably, the MIMO antenna device further includes a signal-source determining unit that is connected electrically to the controller and that is adapted to be coupled to the RF circuit. The signal-source determining unit is operable to determine a source of a RF signal based on intensity of the RF signal received by each of the (N) antenna units, and to generate a control signal corresponding to the source of the RF signal for controlling the controller. The controller is responsive to the control signal so as to control each of the (1×(N/3))-multiplexer units to select one of the (N/3) corresponding ones of the (N) antenna units able to receive a maximum intensity of the RF signal relative to other ones of the antenna units in the (N/3) corresponding ones of the (N) antenna units for connecting electrically the selected one of the antenna units to the RF circuit.

According to yet another aspect, Multiple-Input-Multiple-Output (MIMO) antenna device of the present invention is adapted for connecting electrically to a radio frequency (RF) circuit so as to transmit and receive RF signals. The MIMO antenna device includes a circuit board, a plurality of antenna units, and a plurality of multiplexer units. The circuit board has a peripheral edge. The antenna units are disposed on the circuit board proximate to the peripheral edge of the circuit board, and are arranged in a loop formation. The antenna units are divided into a plurality of groups of the antenna units. Each of the multiplexer units is connected electrically to a respective one of the groups of the antenna units and is operable to select one of the antenna units in the respective one of the groups of the antenna units for connecting electrically the selected one of the antenna units in the respective one of the groups of the antenna units to the RF circuit. Therefore, the MIMO antenna device is able to utilize the MIMO technique using a plurality of independently and simultaneously operating antenna units.

Preferably, the MIMO antenna device further includes a controller connected electrically to the multiplexer units. Each of the multiplexer units is controlled by the controller to select one of the antenna units in the respective one of the groups of the antenna units for connecting electrically the selected one of the antenna units in the respective one of the groups of the antenna units to the RF circuit.

Preferably, the MIMO antenna device further includes a signal-source determining unit that is connected electrically to the controller and that is adapted to be coupled to the RE circuit. The signal-source determining unit is operable to determine a source of a RF signal based on intensity of the RF signal received by each of the antenna units, and to generate a control signal corresponding to the source of the RF signal for controlling the controller. The controller is responsive to the control signal so as to control each of the multiplexer units to select one of the antenna units that is in the respective one of the groups of the antenna units and that is able to receive a maximum intensity of the RF signal relative to other ones of the antenna units in the respective one of the groups of the antenna units for connecting electrically the selected one of the antenna units in the respective one of the groups of the antenna units to the RF circuit.

Through disposing the antenna units on the circuit board, arranging the antenna units in a loop formation, and connecting electrically each of the antenna units to a respective one of the multiplexer units, each of the multiplexer units is operable to select one of the corresponding ones of the antenna units for connecting electrically the selected one of the corresponding ones of the antenna units to the RF circuit. Hence, the RF circuit is able to transmit and receive RF signals via at least two independently operating antenna units so as to utilize the MIMO technique such that wireless broadband access points or wireless routers employing the MIMO antenna device of the present invention is capable of achieving high directivity, high throughput, and antenna radiation beamforming.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
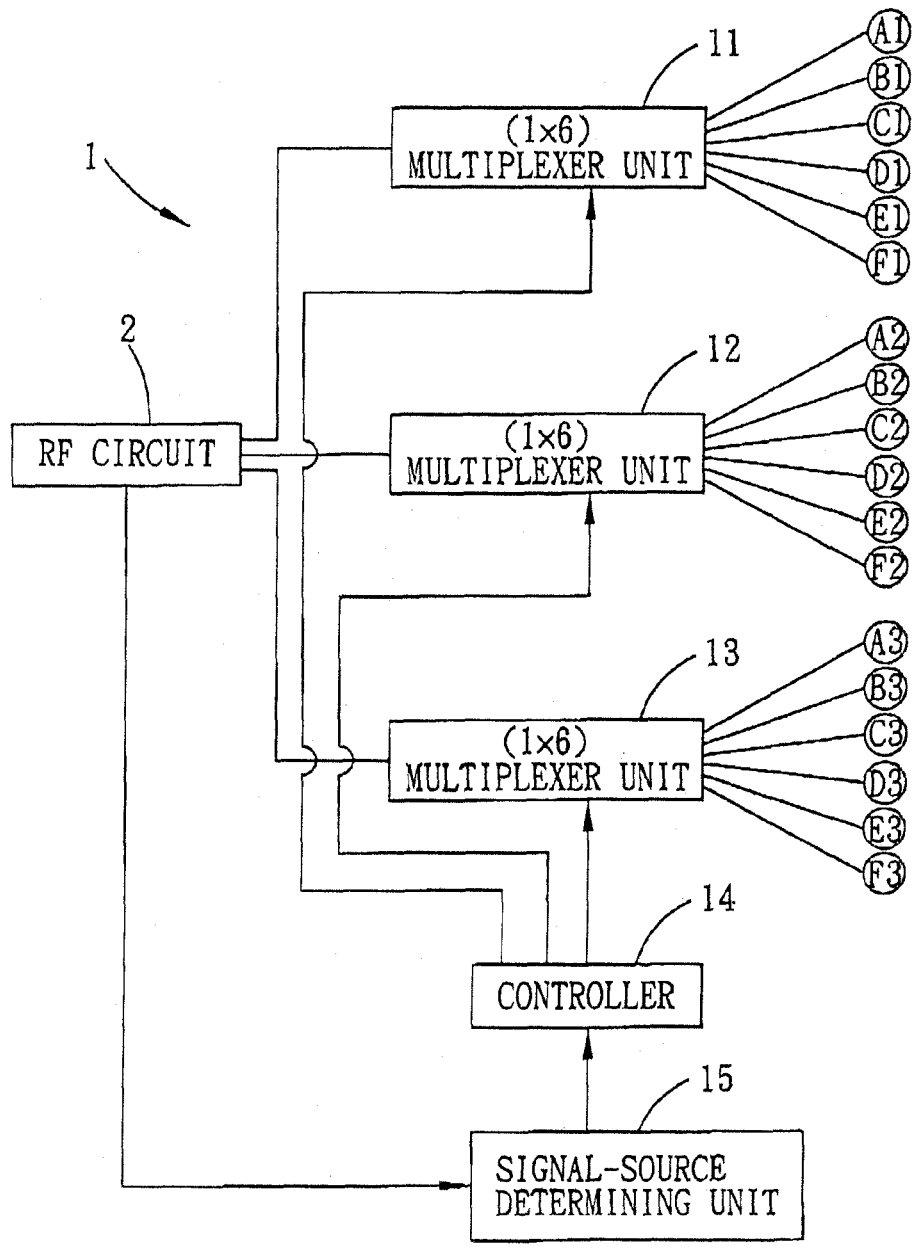
FIG. 1 is a functional block diagram of the first preferred embodiment of a Multiple-Input-Multiple-Output (MIMO) antenna device according to the present invention.

Before the present invention is described in greater detail, it should be noted that like elements are denoted by the same reference numerals throughout the disclosure.

Figure 2:
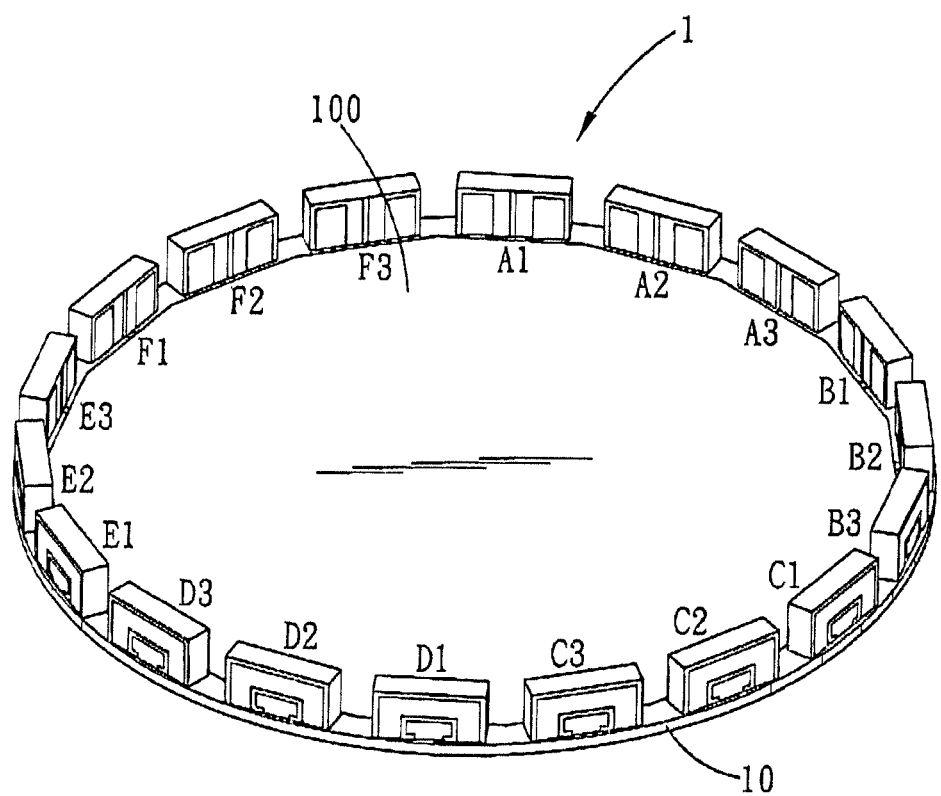
FIG. 2 is a schematic view of a plurality of antenna units and a circuit board of the MIMO antenna device of the first preferred embodiment.

Referring to FIGS. 1 and 2, the first preferred embodiment of a Multiple-Input-Multiple-Output (MIMO) antenna device 1 according to the present invention is adapted to be connected electrically to a Radio Frequency (RF) circuit 2 for transmitting and receiving RF signals. The MIMO antenna device 1 includes a circuit board 10, a number (N) of antenna units ((N) is an integer not smaller than 6 and is a multiple of 3), and a plurality of (1×(N/3))-multiplexer units. In the present embodiment, (N) is equal to 18, and the antenna units are divided equally into first, second, and third groups of antenna units (A1-F1), (A2-F2), (A3-F3). Each of the groups of antenna units is connected electrically to a corresponding one of (1×6)-multiplexer units 11, 12, 13.

The circuit board 10 is a multi-layer board, and at least one of the layers of the circuit board 10 is provided with a ground plane 100 (e.g., a grounding unit). In the present embodiment, the ground plane 100 is disposed on a surface of the circuit board 10.

Figure 3:
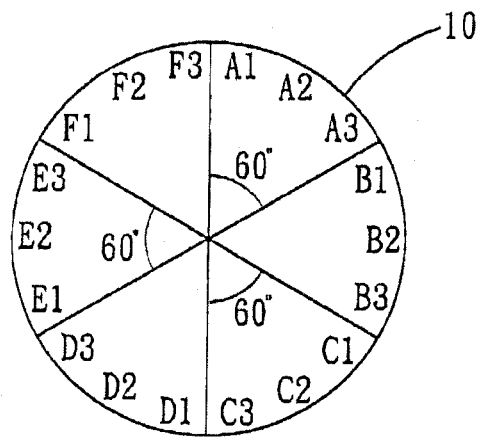
FIG. 3 is a schematic diagram illustrating that each set of antenna units of the MIMO antenna device of the first preferred embodiment covers an included angle of 60°.

The antenna units of the first, second, and third groups of antenna units (A1-F1), (A2-F2), (A3-F3) are vertically disposed on the circuit board 10 proximate to a peripheral edge of the same, are equiangularly spaced apart from adjacent ones thereof, are arranged in a loop formation, and are disposed to surround the ground plane 100. The antennas units of the first, second, and third groups of antenna units (A1-F1), (A2-F2), (A3-F3) can be divided into six sets of antenna units (A1-A3), (B1-B3), (C1-C3), (D1-D3), (E1-E3), and (F1-F3), and are disposed on the circuit board 10 in the order given. Referring to FIG. 3, an angle between adjacent ones of the antenna units is 20° such that each of the antenna units is arranged to transmit and receive RF signals toward and from a unique direction with respect to a horizontal plane. Thus, each of the sets of antenna units (A1-A3), (B1-B3), (C1-C3), (D1-D3), (E1-E3), (F1-F3) covers an included angle (or beam angle) of 60°.

When the antenna device 1 of the first preferred embodiment is configured to operate in a 802.11n network, each of the antenna units of a selected one of the sets of antenna units (A1-A3), (B1-B3), (C1-C3), (D1-D3), (E1-E3), (F1-F3) will be able to achieve a maximum transmission rate of 150 Mbps. That is to say, the MIMO antenna device 1 of the first preferred embodiment will be able to achieve a maximum transmission rate of 450 Mbps when the antenna units of the selected one of the sets of antenna units (A1-A3), (B1-B3), (C1-C3), (D1-D3), (E1-E3), (F1-F3) are configured to transmit or receive RF signals simultaneously. Similarly, a maximum data rate of 600 Mbps can be achieved if each set of antenna units includes four antenna units.

Figure 4:
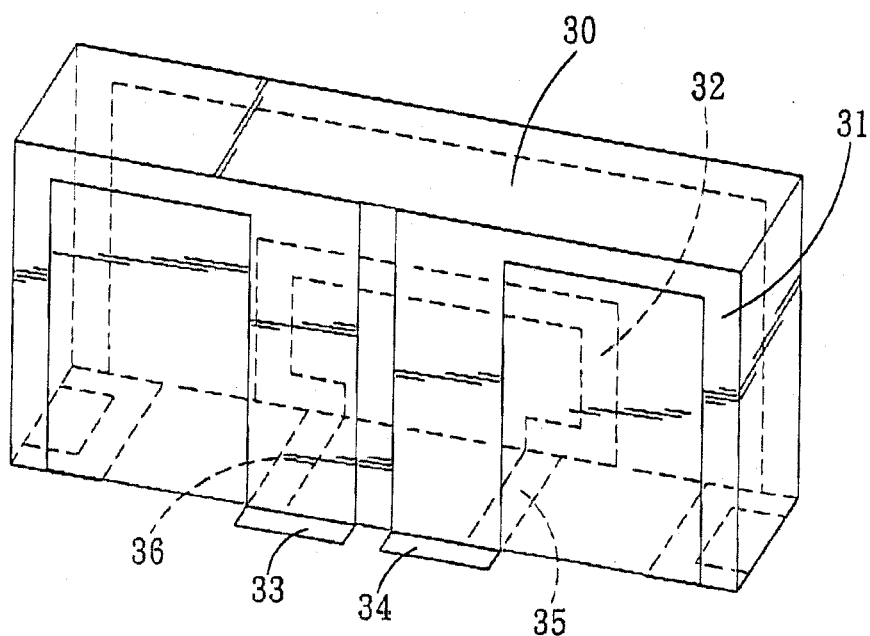
FIG. 4 is a schematic view of one of the antenna units of the MIMO antenna device of the first preferred embodiment.

Referring to FIG. 4, the antenna units of the MIMO antenna device 1 of the present embodiment are one-wavelength loop antennas. Each of the antenna units includes a dielectric substrate 30 that can be made of a ceramic material or that can be a substrate made of fiberglass reinforced epoxy resin or the like, and first and second loop antennas 31, 32. The first and second loop antennas 31, 32 are disposed on the substrate 30, are bent along surfaces of the substrate 30 to conform thereto, are different from each other in terms of dimensions (in this embodiment, dimensions of the first loop antennas 31 are larger than those of the second loop antennas 32), and are operable in first (e.g., a lower frequency band centered on 2.4 GHz) and second (e.g., a higher frequency band centered on 5 GHz) frequency bands, respectively.

The first loop antenna 31 has a first feed portion 33 and a first ground portion 34 that are substantially parallel to each other. The first feed portion 33 is adapted to be coupled to the RF circuit 2 so as to feed RF signals, and the first ground portion 34 is connected electrically to the ground plane 100. The second loop antenna 32 has a second feed portion 36 that is adapted to be coupled to the RF circuit 2 so as to feed RF signals, and a second ground portion 35 that is connected electrically to the ground plane 100. The second feed portion 36 and the second ground portion 35 are substantially parallel to each other, and the former and the latter are connected electrically to the first feed portion 33 and the first ground portion 34 of the first loop antenna 31, respectively.

For each of the antenna units, the first and second feed portions 33, 36 are relatively proximate to one of two adjacent ones of the antenna units. The first and second feed portions 33, 36 of each of the antenna units are adjacent to the first and second ground portions 34, 35 of the same antenna unit, and are adjacent to the first and second ground portions 34, 35 of said one of two adjacent ones of the antenna units such that each first feed portion 33 is interposed between two first ground portions 34, and that each second feed portion 36 is interposed between two second ground portions 35. Such arrangement reduces interference between the first feed portions 33 and between the second feed portions 36 of the antenna units, and ensures that mutual coupling between adjacent ones of the antenna units is below −20 dB.

Moreover, by virtue of bending of the first and second loop antennas 31, 32 and use of the dielectric substrate 30, the antenna units are able to have relatively small dimensions such that the MIMO antenna device 1 can be disposed inside wireless access points or wireless routers, thereby avoiding compromised aesthetics and reducing vulnerability to external force.

Furthermore, each of the one-wavelength loop antennas has a balanced structure for suppressing extensively excited surface currents of the ground plane 100 such that the ground plane 100 can act as a reflector for improving radiation directivity and gain of radiation patterns of the antenna units.

The (1×6)-multiplexer units 11, 12, 13 can be disposed on another surface of the circuit board 10 opposite to the ground plane 100. However, arrangement of the (1×6)-multiplexer units 11, 12, 13 is not limited to such. The (1×6)-multiplexer units 11, 12, 13 are adapted to be connected electrically to the RF circuit 2. Referring to FIG. 1, each of the (1×6)-multiplexer units 11, 12, 13 has six input terminals, each of the six input terminals is connected electrically to at least one of the first and, second feed portions 33, 36 of a corresponding one of the antenna units, and each of the (1×6)-multiplexer units 11, 12, 13 is operable to select one of the six corresponding ones of the antenna units connected thereto for connecting electrically the selected one of the six corresponding ones of the antenna units to the RF circuit 2.

By controlling each of the (1×6)-multiplexer units 11, 12, 13 to select one of the six corresponding ones of the antenna units and to connect electrically the selected one of the six corresponding ones of the antenna units to the RF circuit 2, and by configuring the RF circuit 2 to transmit and receive RF signals via each of the selected ones of the antenna units connected thereto, the MIMO antenna device 1 is able to utilize the MIMO technique and is operable to achieve antenna radiation beamforming. The antenna units of the present invention are used in a more efficient manner that a combined radiation pattern is directed toward an intended receiver, thereby ensuring quality of communication and increasing range of coverage.

The antenna device 1 further includes a controller 14 and a signal-source determining unit 15 for controlling the (1×6)-multiplexer units 11, 12, 13 so as to control selection of the antenna units.

The signal-source determining unit 15 is adapted to be coupled to the RF circuit 2, and is connected electrically to the controller 14. The signal-source determining unit 15 is operable to determine a location of a source of a received RF signal based on intensity of the RF signal received by each of the antenna units (e.g., cause the RF circuit 2 to receive the RF signal via each of the antenna units), and is operable to generate a control signal corresponding to the determined location of the source of the received RF signal for controlling the controller 14. The controller 14 is responsive to the control signal so as to control each of the (1×6)-multiplexer units 11, 12, 13 to select one of the corresponding ones of the antenna units able to receive a maximum intensity of the RF signal relative to other ones of the corresponding ones of the antenna units for connecting the selected one of the antenna units to the RF circuit 2. For example, the signal-source determining unit 15 will cause the controller 14 to control the (1×6)-multiplexer units 11, 12, 13 to select antenna units A1, A2, A3, and to connect electrically the selected antenna units A1, A2, A3 to the RF circuit 2 when each of antenna units A1, A2, A3 is able to receive a relatively maximum intensity of a RF signal, and will further cause the controller 14 to control the (1×6)-multiplexer units 11, 12, 13 to select antenna units C1, C2, C3 when the source of the RF signal moves to a location where each of antenna units C1, C2, C3 is able to receive a relatively maximum intensity of the RF signal. Therefore, the MIMO antenna device 1 is operable to radiate a directional radiation pattern and to direct the beam-shaped radiation pattern toward an intended receiver for farther communications range. Therefore, the MIMO antenna device 1 can be used in a Wireless Local Area Network (802.11a/b/g/n) for achieving high directivity and high data rate.

Besides, when the directivity is not taken into consideration, the (1×6)-multiplexer units 11, 12, 13 do not necessarily have to select antenna units of a same set of antenna units (e.g., A1, A2, A3) or three consecutive antenna units (e.g., C1, C2, B3). In other words, the (1×6)-multiplexer units 11, 12, 13 can select three antenna units that are not adjacent to each other so as to transmit and receive RF signals in different directions or regions.

Figure 5:
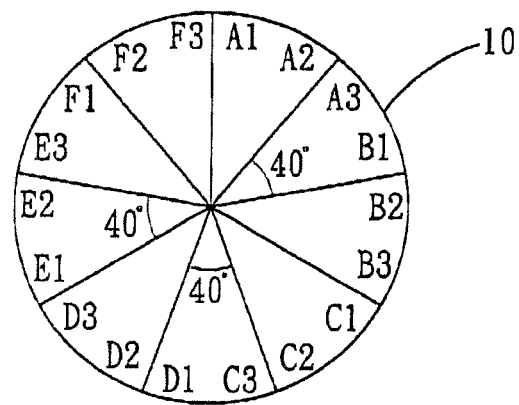
FIG. 5 is a schematic diagram illustrating that each set of antenna units of the MIMO antenna device of the first preferred embodiment covers a an included angle of 40°.

In addition, to further improve directivity of the antenna units, the controller 14 is operable to control only two of the (1×6)-multiplexer units 11, 12, 13 to operate such that each of said two of the (1×6)-multiplexer units 11, 12, 13 is controlled to select one of the six corresponding ones of the antenna units and to connect electrically the selected corresponding one of the antenna units to the RF circuit 2. In other words, only two adjacent ones of the antenna units are used for transmitting and receiving RF signals simultaneously. Hence, as shown in FIG. 5, the antenna units of the first, second, third groups of antenna units (A1-F1), (A2-F2), (A3-F3) can be divided into nine sets of antenna units (A1, A2), (A3, B1), (B2, B3), (C1, C2), (C3, D1), (D2, D3), (E1, E2), (E3, F1), and (F2, F3), each set of antenna units being operable to utilize the MIMO technique and to cover an included angle of 40° for improving directivity of the antenna units.

Figure 6:
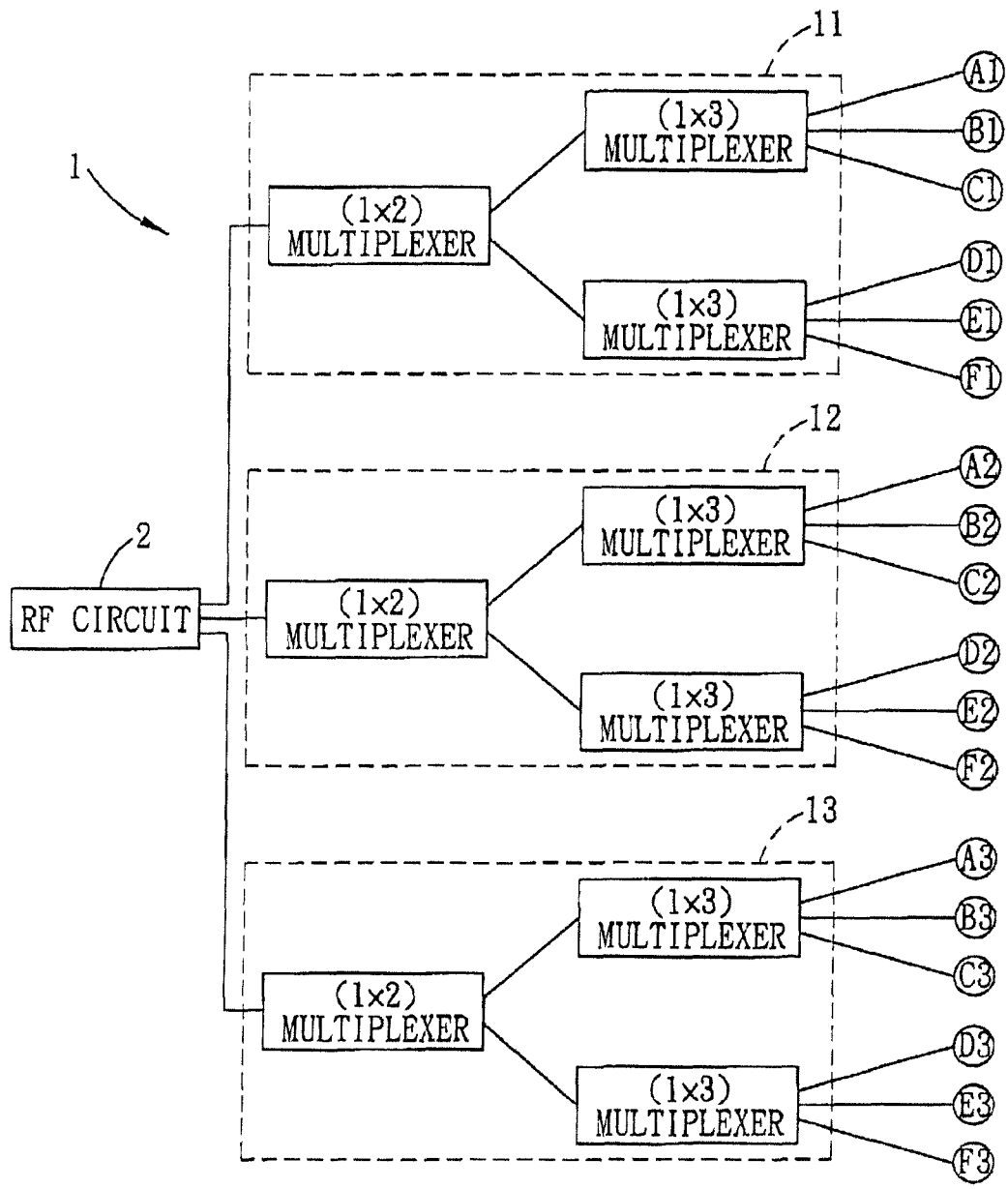
FIG. 6 is a schematic diagram illustrating that each of (1×6)-multiplexer units of the MIMO antenna device of the first preferred embodiment can include one (1×2)-multiplexer and two (1×3)-multiplexers.
Figure 7:
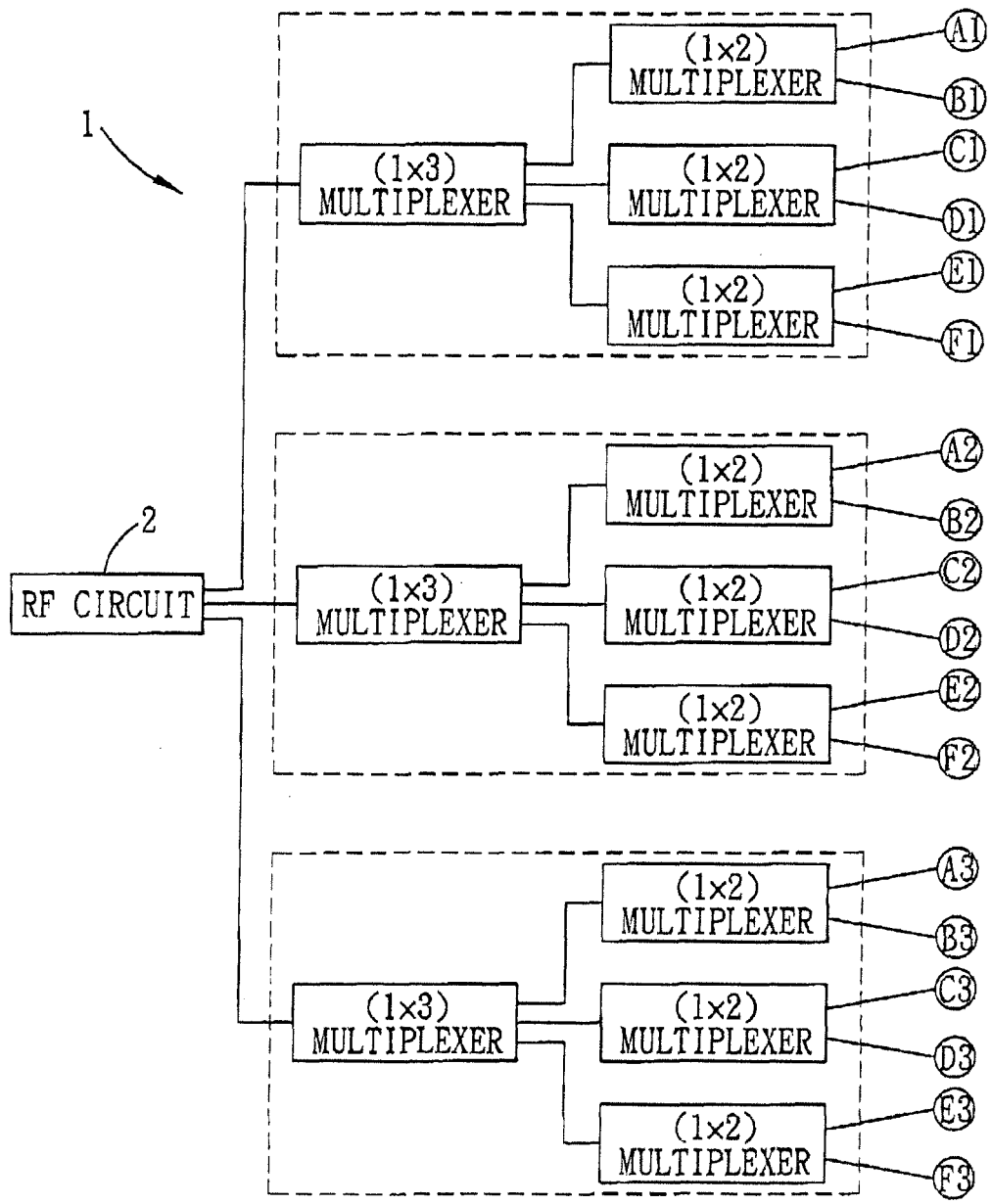
FIG. 7 is a schematic diagram illustrating that each of (1×6)-multiplexer units of the MIMO antenna device of the first preferred embodiment can include one (1×3)-multiplexer and three (1×2)-multiplexers.

Referring to FIGS. 6 and 7, each of the (1×6)-multiplexer units 11, 12, 13 can be implemented using two (1×3)-multiplexers and one (1×2)-multiplexer, or using three (1×2)-multiplexers and one (1×3)-multiplexer.

Figure 8:
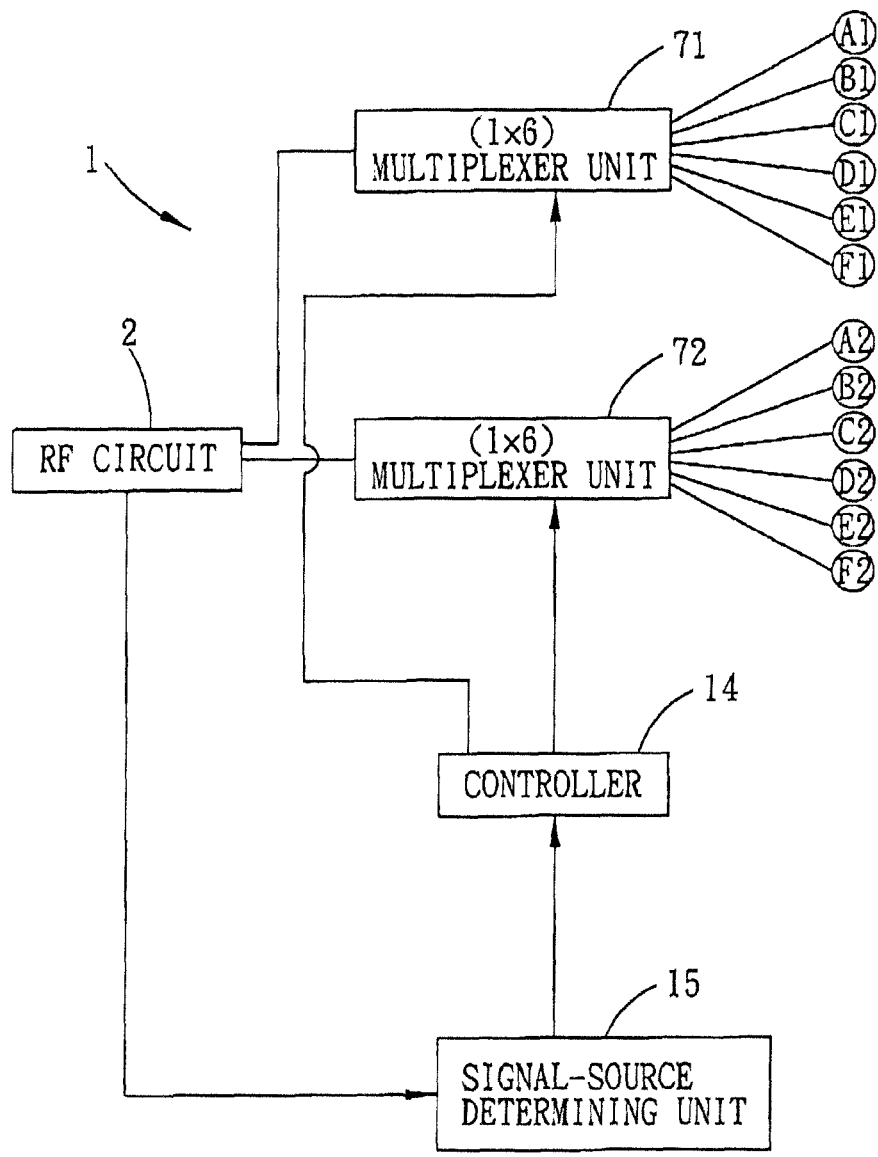
FIG. 8 is a functional block diagram of the second preferred embodiment of a MIMO antenna device according to the present invention.
Figure 9:
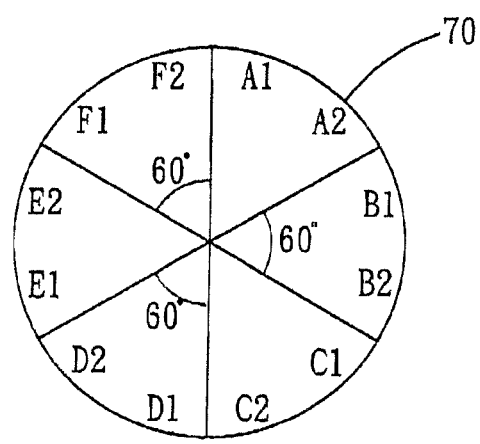
FIG. 9 is a schematic diagram illustrating that each set of antenna units of the MIMO antenna device of the second preferred embodiment covers an included angle of 60°.

Referring to FIG. 8, the second preferred embodiment of a MIMO antenna device 1 according to the present invention includes a number (N) of antenna units (N is not smaller than 5) divided into first and second groups of antenna units, a (1×M)-multiplexer unit, and a (1×(N−M))-multiplexer unit (M is not smaller than 2 and is smaller than (N−1)). In the present embodiment, the first and second groups of antenna units include (M) and (N−M) antenna units, respectively. (N) and (M) are equal to 12 and 6, respectively. Thus, the MIMO antenna device 1 includes first and second groups of antenna units (A1-F1), (A2-F2), and first and second (1×6)-multiplexer units 71, 72. Referring to FIG. 9, the first and second groups of antenna units (A1-F1), (A2-F2) are disposed on a circuit board 70 in a loop formation and in the order given, and the first and second groups of antenna units (A1-F1), (A2-F2) are connected electrically and respectively to the first and second (1×6)-multiplexer units 71, 72.

The first and second (1×6)-multiplexers units 71, 72 are controlled by a controller 14 such that each of the first and second (1×6)-multiplexer units 71, 72 is controlled to select one of the six corresponding ones of the antennas units for connecting electrically the selected one of the six corresponding ones of the antenna units to the RF circuit 2. Thus, as shown in FIG. 9, the antenna units of the first and second groups of antenna units (A1-F1) (A2-F2) can be divided into six sets of antenna units (A1, A2), (B1, B2), (C1, C2), (D1, D2), (E1, E2), and (F1, F2). Each of the sets is operable to utilize the MIMO technique and covers an included angle of 60°. The other components and operations thereof in the present embodiment are identical to those in the first preferred embodiment, and hence will not be described hereinafter for the sake of brevity.

Figure 10:
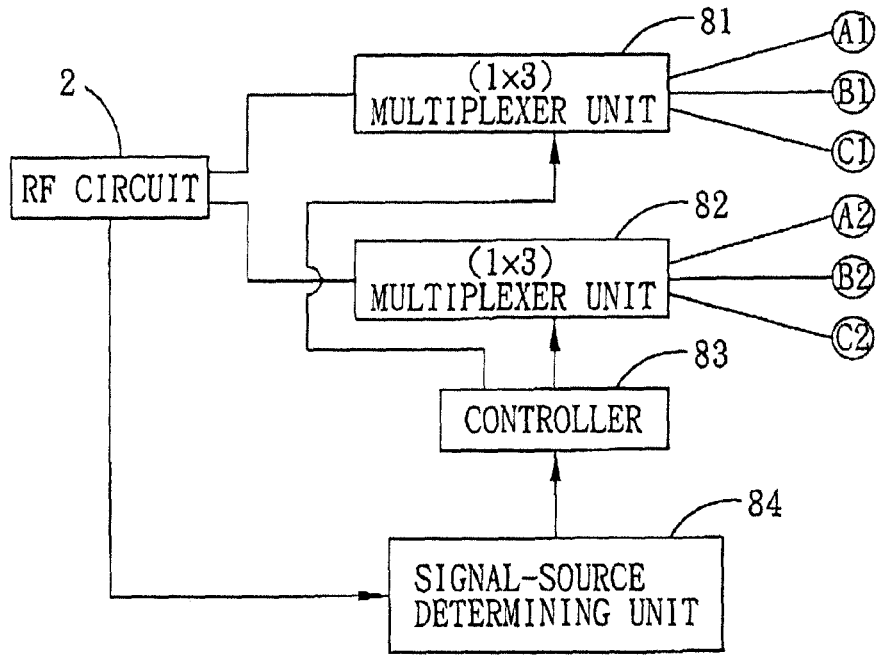
FIG. 10 is a functional block diagram of the third preferred embodiment of a MIMO antenna device according to the present invention.
Figure 11:
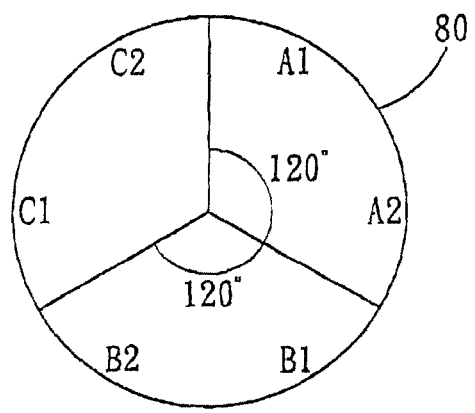
FIG. 11 is a schematic diagram illustrating that each set of antenna units of the MIMO antenna device of the third preferred embodiment covers an included angle of 120°.

Referring to FIG. 10, the third preferred embodiment of a MIMO antenna device 1 according to the present invention includes first and second (1×3)-multiplexer units 81, 82, and first and second groups of antenna units (A1, B1, C1), (A2, B2, C2). Positions of the first and second groups of antenna units (A1, B1, C1), (A2, B2, C2) with respect to a circuit board 80 are as shown in FIG. 11. The first and second (1×3)-multiplexer units 81, 82 are connected electrically and respectively to the first and second groups of antenna units (A1, B1, C1), (A2, B2, C2). Each of the first and second groups of antenna units (A1, A2, B1), (B2, C1, C2) covers an included angle of 180°. A controller 83 is connected to the first and second (1×3)-multiplexer units 81, 82 and is responsive to a control signal generated by a signal-source determining unit 84 for controlling each of the (1×3)-multiplexer units 81, 82 to select one of the three corresponding ones of the antenna units and to connect electrically the selected one of the three corresponding ones of the antenna units to the RF circuit 2 so as to enable transmission and receipt of RF signals via one of the first and second groups of antenna units (A1, A2, B1) and (B2, C1, C2).

Of course, the first and second (1×3)-multiplexer units 81, 82 of the third preferred embodiment can be replaced by first, second, and third (1×2)-multiplexer units. The antenna units of the first and second groups of antenna units (A1, B1, C1), (A2, B2, C2) can be divided into first, second, and third sets of antenna units (A1, A2), (B1, B2), (C1, C2) - - - or (A2, B1), (B2, C1), (C2, A1). The first, second, and third (1×2)-multiplexer units are connected electrically and respectively to the first, second, and third sets of antenna units (A1, B2), (A2, C1), (B1, C2). Each of first, second, and third sets of antenna units (A1, B2), (A2, C1), (B1, C2) is operable to utilize the MIMO technique and covers an included angle of 120°. Hence, the MIMO antenna device 1 of the third preferred embodiment is operable to utilize the MIMO technique with a minimum number of antenna units.

Figure 12:
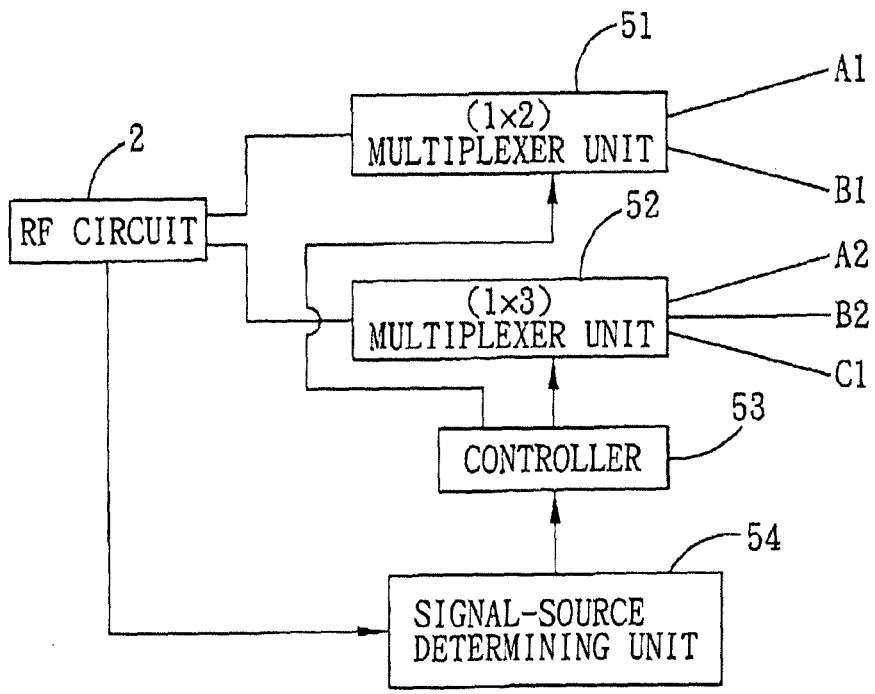
FIG. 12 is a functional block diagram of the fourth preferred embodiment of a MIMO antenna device according to the present invention.

Referring to FIG. 12, the fourth preferred embodiment of a MIMO antenna device 1 according to the present invention is based on the second preferred embodiment. However, (N) in the present embodiment is equal to 5, i.e., the minimum number of antenna units required for achieving farther communications range with omnidirectional coverage and implementing the MIMO technique for higher data rate.

Figure 13:
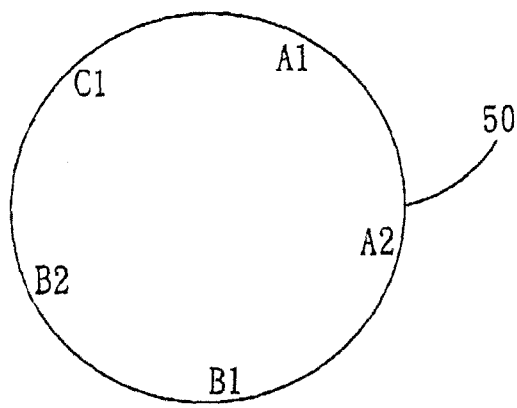
FIG. 13 is a schematic diagram illustrating arrangement of antenna units of the MIMO antenna device of the fourth preferred embodiment on a circuit board.

In the present embodiment, a (1×2)-multiplexer unit 51 has input terminals connected electrically and respectively to a first group of antenna units (A1, B1), and a (1×3)-multiplexer unit 52 has input terminals connected electrically and respectively to a second group of antenna units (A2, B2, C1). The positions of the first and second groups of antenna units (A1, B1), (A2, B2, C1) with respect to a circuit board 50 are as shown in FIG. 13. The MIMO antenna device 1 of the present embodiment includes a controller 53 for controlling each of the (1×2)-multiplexer unit 51 and the (1×3)-multiplexer unit 52 to select one of the corresponding antenna units of a respective one of the first and second groups of antenna units (A1, B1), (A2, B2, C1) and to connect electrically the selected one of the corresponding antenna units to the RF circuit 2. The MIMO antenna device 1 of the fourth preferred embodiment is thus able to achieve beamforming and to utilize the MIMO technique with a minimum number of antenna units.

It is to be noted that single-output multiplexers are used in the above-mentioned preferred embodiments. However, in practice, if production cost is not a major consideration, multiple-input-multiple-output multiplexers can also be employed. For example, if the MIMO antenna device 1 includes 16 antenna units, and each transmission and reception of RF signals requires four of the antenna units, the MIMO antenna device 1 can employ two (2×8)-multiplexer units. Each of the two (2×8)-multiplexer units is connected electrically to eight corresponding ones of the antenna units for selecting two of the eight corresponding ones of the antenna units connected thereto and for connecting electrically the selected two of the eight corresponding ones of the antenna units to the RF circuit 2. The MIMO antenna device 1 can thus utilize the MIMO technique, and is suitable to be used in a 802.11 a/b/g/n network for increasing throughput.

In summary, through disposing the antenna units on the circuit board, arranging the antenna units in a loop formation, and connecting electrically each of the antenna units to a respective one of the multiplexer units, each of the multiplexer units is operable to select one of the corresponding ones of the antenna units for connecting electrically the selected one of the corresponding ones of the antenna units to the RF circuit. Thus, the RF circuit is able to transmit and receive RF signals simultaneously via at least two independently operating antenna units so as to utilize the MIMO technique. Therefore, wireless broadband access points or wireless routers that employ the MIMO antenna device of the present invention are able to achieve high directivity, high throughput, and farther communications range with omnidirectional coverage.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A multiple-input multiple-output (MIMO) antenna device adapted for connecting electrically to a radio frequency (RF) circuit so as to transmit and receive RF signals, said MIMO antenna device comprising:
a circuit board having a peripheral edge;
a number (N) of antenna units disposed on said circuit board proximate to said peripheral edge of said circuit board and arranged in a loop formation, wherein the number (N) is a positive integer;
a (1×M)-multiplexer unit disposed on said circuit board, connected electrically to a number (M) of corresponding ones of said (N) antenna units, and operable to select one of said (M) corresponding ones of said antenna units for connecting electrically the selected one of said antenna units to the RF circuit, wherein the number (M) is a positive integer; and
a (1×(N−M))-multiplexer unit disposed on said circuit board, connected electrically to remaining (N−M) corresponding ones of said (N) antenna units, and operable to select one of said (N−M) corresponding ones of said antenna units for connecting electrically the selected one of said antenna units to the RF circuit;
wherein said circuit board has a ground plane, and said (N) antenna units are disposed to surround said ground plane.

2. The MIMO antenna device as claimed in claim 1, further comprising a controller connected electrically to said (1×M)-multiplexer unit and said (1×(N−M))-multiplexer unit,
said (1×M)-multiplexer unit being controlled by said controller to select one of said (M) corresponding ones of said antenna units for connecting electrically the selected one of said antenna units to the RF circuit,
said (1×(N−M))-multiplexer unit being controlled by said controller to select one of said (N−M) corresponding ones of said antenna units for connecting electrically the selected one of said antenna units to the RF circuit.

3. The MIMO antenna device as claimed in claim 2, further comprising a signal-source determining unit that is connected electrically to said controller and that is adapted to be coupled to the RF circuit, said signal-source determining unit being operable to determine a source of a RF signal based on intensity of the RF signal received by each of said (N) antenna units and to generate a control signal corresponding to the source of the RF signal for controlling said controller, said controller being responsive to the control signal so as to control
said (1×M)-multiplexer unit to select one of said (M) corresponding ones of said antenna units able to receive a maximum intensity of the RF signal relative to other ones of said antenna units in said (M) corresponding ones of said antenna units for connecting electrically the selected one of said antenna units in said (M) corresponding ones of said antenna units to the RF circuit, and
said (1×(N−M))-multiplexer unit to select one of said (N−M) corresponding ones of said antenna units able to receive a maximum intensity of the RF signal relative to other ones of said antenna units in said (N−M) corresponding ones of said antenna units for connecting electrically the selected one of said antenna units in said (N−M) corresponding ones of said antenna units to the RF circuit.

4. The MIMO antenna device as claimed in claim 1, wherein each of said (N) antenna units is a one-wavelength loop antenna and includes a dielectric substrate that has a surface, and a first loop antenna and a second loop antenna that are disposed on said surface of said dielectric substrate, said first and second loop antennas being operable in first and second frequency bands, respectively.

5. The MIMO antenna device as claimed in claim 4, wherein said first loop antenna has a first feed portion and a first ground portion, said first feed portion being substantially parallel to said first ground portion, said first feed portion being adapted to be coupled to the RF circuit so as to permit feeding of the RF signal therebetween, said first ground portion being connected electrically to said ground plane of said circuit board.

6. The MIMO antenna device as claimed in claim 4, wherein said second loop antenna has a second feed portion adapted to be coupled to the RF circuit so as to permit feeding of the RF signal therebetween the RF signal, and a second ground portion connected electrically to said ground plane of said circuit board, said second feed portion being substantially parallel to said second ground portion.

7. The MIMO antenna device as claimed in claim 1, wherein (N) is an integer not smaller than 5, and (M) is an integer that is not smaller than 2 and that is smaller than (N−1).

8. The MIMO antenna device as claimed in claim 1, wherein (N) is equal to 5, and (M) ranges from 1 to 4.

9. The MIMO antenna device as claimed in claim 1, wherein (N) is equal to 6 and (M) is equal to 3.

10. The MIMO antenna device as claimed in claim 1, wherein (N) is equal to 12 and (M) is equal to 6, said (1×M)-multiplexer unit being a (1×6)-multiplexer unit having six corresponding ones of said antenna units connected electrically thereto, said (1×(N−M))-multiplexer unit being a (1×6)-multiplexer unit having another six corresponding ones of said antenna units connected electrically thereto.

11. The MIMO antenna device as claimed in claim 10, wherein
   each of said (1×6)-multiplexer units includes a (1×2)-multiplexer and two (1×3)-multiplexers connected to said (1×2)-multiplexer,
   each of said (1×3)-multiplexers being connected electrically to three corresponding ones of said antenna units and being operable to select one of said three corresponding ones of said antenna units for connecting electrically the selected one of said three corresponding ones of said antenna units to said (1×2)-multiplexer,
   said (1×2)-multiplexer being operable to select one of said antenna units connected electrically thereto via said (1×3)-multiplexers for connecting electrically said antenna unit selected thereby to the RF circuit.

12. The MIMO antenna device as claimed in claim 10, wherein
   each of said (1×6)-multiplexer units includes a (1×3)-multiplexer and three (1×2)-multiplexers connected to said (1×3)-multiplexer,
   each of said (1×2)-multiplexers being connected electrically to two corresponding ones of said antenna units and being operable to select one of said two corresponding ones of said antenna units for connecting electrically the selected one of said two corresponding ones of said antenna units to said (1×3)-multiplexer,
   said (1×3)-multiplexer being operable to select one of said antenna units connected electrically thereto via said (1×2)-multiplexers for connecting electrically said antenna unit selected thereby to the RF circuit.

13. A multiple-input multiple-output (MIMO) antenna device adapted for connecting electrically to a radio frequency (RF) circuit so as to transmit and receive RF signals, said MIMO antenna device comprising:
   a circuit board having a peripheral edge;
   a plurality of antenna units disposed on said circuit board proximate to said peripheral edge of said circuit board and arranged in a loop formation, said antenna units being divided into a plurality of groups of said antenna units; and
   a plurality of multiplexer units, each of which is connected electrically to a respective one of said groups of said antenna units and is operable to select one of said antenna units in the respective one of said groups of said antenna units for connecting electrically the selected one of said antenna units in the respective one of said groups of said antenna units to the RF circuit;
   wherein said circuit board has a ground plane, and said antenna units are disposed to surround said ground plane.

14. The MIMO antenna device as claimed in claim 13, further comprising a controller connected electrically to said multiplexer units, each of said multiplexer units being controlled by said controller to select one of said antenna units in the respective one of said groups of said antenna units for connecting electrically the selected one of said antenna units in the respective one of said groups of said antenna units to the RF circuit.

15. The MIMO antenna device as claimed in claim 14, further comprising a signal-source determining unit that is connected electrically to said controller and that is adapted to be coupled to the RF circuit, said signal-source determining unit being operable to determine a source of a RF signal based on intensity of the RF signal received by each of said antenna units, and to generate a control signal corresponding to the source of the RF signal for controlling said controller, said controller being responsive to the control signal to control each of said multiplexer units to select one of said antenna units that is in the respective one of said groups of said antenna units and that is able to receive a maximum intensity of the RF signal relative to other ones of said antenna units in the respective one of said groups of said antenna units for connecting electrically the selected one of said antenna units in the respective one of said groups of said antenna units to the RF circuit.

16. The MIMO antenna device as claimed in claim 13, wherein each of said antenna units is a one-wavelength loop antenna and includes a dielectric substrate that has a surface, and a first loop antenna and a second loop antenna that are disposed on said surface of said dielectric substrate, said first and second loop antennas being operable in first and second frequency bands, respectively.

17. The MIMO antenna device as claimed in claim 16, wherein said first loop antenna has a first feed portion and a first ground portion, said first feed portion being substantially parallel to said first ground portion, said first feed portion being adapted to be coupled to the RF circuit so as to permit feeding of the RF signal therebetween, said first ground portion being connected electrically to said ground plane of said circuit board.

18. The MIMO antenna device as claimed in claim 16, wherein said second loop antenna has a second feed portion adapted to be coupled to the RF circuit so as to permit feeding of the RF signal therebetween, and a second ground portion connected electrically to said ground plane of said circuit board, said second feed portion being substantially parallel to said second ground portion.

* * * * *